(12) United States Patent
Balakrishnan (10) Patent No.: US 9,088,620 B2
(45) Date of Patent: Jul. 21, 2015

(54) SYSTEM AND METHOD OF RECOMMENDING ACTIONS BASED ON SOCIAL CAPITAL OF USERS IN A SOCIAL NETWORK

(75) Inventor: Rajalakshmi Balakrishnan, Santa Clara, CA (US)

(73) Assignee: Fujitsu Limited, Kawasaki-shi (JP)

( * ) Notice: Subject to any disclaimer, the term of this patent is extended or adjusted under 35 U.S.C. 154(b) by 72 days.

(21) Appl. No.: 13/536,300

(22) Filed: Jun. 28, 2012

(65) Prior Publication Data

US 2014/0006493 A1    Jan. 2, 2014

(51) Int. Cl.
*G06F 15/16* (2006.01)
*H04L 29/08* (2006.01)

(52) U.S. Cl.
CPC .................................. *H04L 67/22* (2013.01)

(58) Field of Classification Search
CPC ............................. H04L 51/32; H04L 67/22
USPC ............................... 709/200, 204, 224; 705/7
See application file for complete search history.

(56) References Cited

U.S. PATENT DOCUMENTS

| | | | |
|---|---|---|---|
| 8,010,460 B2 * | 8/2011 | Work et al. | 705/319 |
| 8,499,247 B2 * | 7/2013 | Niyogi et al. | 715/753 |
| 8,725,858 B1 * | 5/2014 | Wu et al. | 709/223 |
| 2009/0164624 A1 * | 6/2009 | Metcalf et al. | 709/224 |
| 2009/0217178 A1 * | 8/2009 | Niyogi et al. | 715/753 |
| 2009/0319359 A1 * | 12/2009 | Soza et al. | 705/14.25 |
| 2010/0088130 A1 | 4/2010 | Bonchi et al. | 705/7 |
| 2010/0241713 A1 * | 9/2010 | Shimizu | 709/206 |
| 2011/0066949 A1 * | 3/2011 | DeLuca et al. | 715/744 |
| 2011/0184792 A1 | 7/2011 | Butcher et al. | |
| 2011/0307397 A1 | 12/2011 | Benmbarek | |
| 2012/0036202 A1 * | 2/2012 | Cole et al. | 709/206 |
| 2012/0110080 A1 * | 5/2012 | Panyam et al. | 709/204 |
| 2012/0158455 A1 * | 6/2012 | Pathak et al. | 705/7.29 |
| 2012/0191777 A1 * | 7/2012 | Iwasaki et al. | 709/204 |
| 2012/0203846 A1 * | 8/2012 | Hull et al. | 709/206 |
| 2012/0233256 A1 * | 9/2012 | Shaham et al. | 709/204 |
| 2012/0324004 A1 * | 12/2012 | Le et al. | 709/204 |
| 2013/0054698 A1 * | 2/2013 | Lee et al. | 709/204 |
| 2013/0159507 A1 * | 6/2013 | Mason et al. | 709/224 |
| 2013/0179511 A1 * | 7/2013 | Stevens et al. | 709/204 |
| 2013/0254192 A1 * | 9/2013 | Work et al. | 707/732 |
| 2013/0254280 A1 * | 9/2013 | Yang et al. | 709/204 |
| 2013/0275514 A1 * | 10/2013 | Tanaka et al. | 709/204 |
| 2014/0019225 A1 * | 1/2014 | Guminy et al. | 705/14.39 |
| 2014/0019539 A1 * | 1/2014 | Novak et al. | 709/204 |

OTHER PUBLICATIONS

Specification for U.S. Appl. No. 61/407,018.*
Extended European Serach Report; Application No. 13165897.3-1958; pp. 7, Jul. 31, 2013.

* cited by examiner

*Primary Examiner* — Anthony Mejia
(74) *Attorney, Agent, or Firm* — Baker Botts L.L.P.

(57) ABSTRACT

In accordance with embodiments of the present disclosure, a method may include calculating an influence score relating to an action performed by a user of a social network, the influence score for the user being based on performance of the action by a contact of the user and occurring after performance of the action by the user and calculating an action score based on the influence score for the user.

15 Claims, 3 Drawing Sheets

| USER | TIME |
|------|------|
| u3 | 13 |
| u2 | 13 |
| u1 | 15 |
| u5 | 16 |
| u4 | 17 |
| u7 | 18 |

SYSTEM AND METHOD OF RECOMMENDING ACTIONS BASED ON SOCIAL CAPITAL OF USERS IN A SOCIAL NETWORK

TECHNICAL FIELD

This disclosure generally relates to social networking, and in particular, recommending actions to users based on the social capital of other users in a social network.

BACKGROUND

As the popularity of the Internet has increased, so has the prevalence of social networking websites and applications. Generally speaking, a social network refers to an application or service that facilitates the building of online communities of people who share interests and activities, or who are interested in exploring the interests and activities of others. Many social network services are web-based and provide a variety of ways for users to interact, such as e-mail and instant messaging services.

In many social networks, a particular user may allow their social contacts to view various actions taken by the particular user. As an example, the user may use a social bookmarking web service to perform the action of bookmarking a web Uniform Resource Locator (URL) and tagging it with a descriptive tag. As another example, the user may use a social networking site relating to movies to perform the action of rating and/or reviewing a movie. As a further example, the user may perform the action of writing a review of a product in a personal blog, such as a status update in a social networking application. As yet another example, the user may perform the action of "checking in" to a particular venue.

The user's social contacts may view the user's actions on the social network and may be interested in performing the same or similar actions (e.g., visiting a website tagged by the user in social bookmarking website, purchasing or renting a movie reviewed by the user at the movie-related social networking site, or purchasing a product reviewed on the user's personal blog). Accordingly, the user may be said to have influenced actions performed by his or her social contacts. In a social network, such actions may further propagate to contacts of the user's contacts. Such a user influence pattern may be referred to as "social capital."

SUMMARY

In accordance with embodiments of the present disclosure, a method may include calculating an influence score relating to an action performed by a user of a social network, the influence score for the user being based on performance of the action by a contact of the user and occurring after performance of the action by the user and calculating an action score based on the influence score for the user.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

DESCRIPTION OF EXAMPLE EMBODIMENTS

Figure 1:
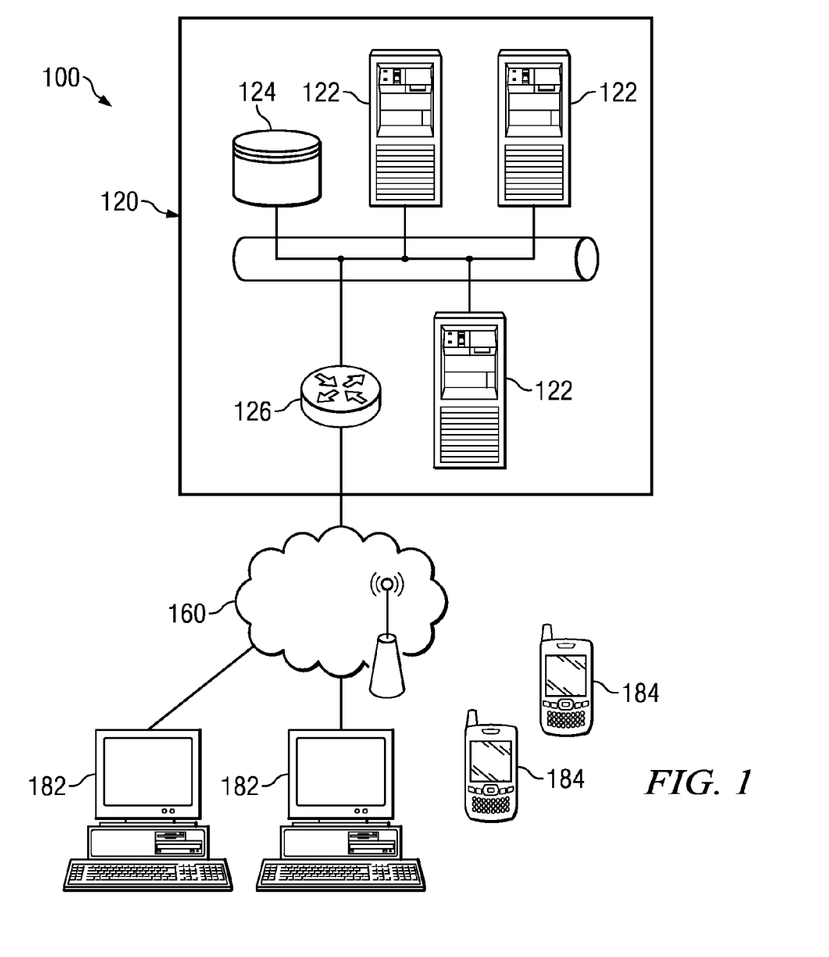
FIG. 1 illustrates an example network environment, in accordance with embodiments of the present disclosure.

FIG. 1 illustrates an example network environment, in accordance with embodiments of the present disclosure. Particular implementations of the invention operate in a wide area network environment, such as the Internet, including multiple network addressable systems. Network cloud 160 generally represents one or more interconnected networks, over which the systems and hosts described herein can communicate. Network cloud 160 may include packet-based wide area networks (such as the Internet), private networks, wireless networks, satellite networks, cellular networks, paging networks, and the like.

As FIG. 1 illustrates, a particular implementation of the invention may operate in a network environment comprising network application hosting site 120, such as an informational web site, social network site and the like. Although FIG. 1 illustrates only one network application hosting site, implementations of the invention may operate in network environments that include multiples of one or more of the individual systems and sites disclosed herein. Client nodes 182, 184 may be operably connected to the network environment via a network service provider or any other suitable means.

A client node may include a computer or computing device including functionality for communicating over a computer network. A client node may include a personal computer 82 (e.g., a desktop, laptop, notebook, or tablet computer, etc.) or a mobile devices 84 (e.g., a cellular telephone, a smartphone, a personal digital assistant, etc.). A client node may execute one or more client applications, such as a web browser, to access and view content over a computer network. In particular implementations, the client applications allow users to enter addresses of specific network resources to be retrieved. These addresses can be Uniform Resource Locators, or URLs. In addition, once a page or other resource has been retrieved, the client applications may provide access to other pages or records when the user "clicks" on hyperlinks to other resources. In some implementations, such hyperlinks are located within web pages and provide an automated way for the user to enter the URL of another page and to retrieve that page. The pages or resources can be data records including as content plain textual information, or more complex digitally encoded multimedia content, such as software programs or other code objects, graphics, images, audio signals, videos, and so forth.

The networked systems described herein may communicate over the network 160 using any suitable communications protocols. For example, client nodes 182, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context may be a client in another interaction context. Still further, in particular implementations, the information transmitted between hosts may be formatted as HyperText Markup Language (HTML) documents. Other structured document languages or formats can be used, such as eXtensible Markup Language (XML), and the like.

In some client-server protocols, such as the use of HTML over HTTP, a server generally transmits a response to a request from a client. The response may include one or more data objects. For example, the response may include a first data object, followed by subsequently transmitted data objects. In one implementation, for example, a client request may cause a server to respond with a first data object, such as an HTML page, which itself refers to other data objects. A client application, such as a browser, will request these additional data objects as it parses or otherwise processes the first data object.

Mobile client nodes 184 may use other communications protocols and data formats. For example, mobile client nodes 184, in some implementations, may include Wireless Application Protocol (WAP) functionality and a WAP browser. The use of other wireless or mobile device protocol suites is also possible. In addition, the network environment may also include protocol translation gateways, proxies or other systems to allow mobile client nodes 184, for example, to access other network protocol environments. For example, a user may use a mobile client node 184 to capture an image and upload the image over the carrier network to a content site connected to the Internet.

Network application hosting site 120 may be a network addressable system that hosts a network application accessible to one or more users over a computer network. The network application may be an informational web site where users request and receive identified web pages and other content over the computer network. The network application may also be a search platform, an on-line forum or blogging application where users may submit or otherwise configure content for display to other users. The network application may also be a social network application allowing users to configure and maintain personal web pages. The network application may also be a content distribution application, (e.g., a music store/library, a podcasting server), that displays available content, and transmits content to users.

Network application hosting site 120, may include one or more physical servers 122 and content data store 124. The one or more physical servers 22 may be operably connected to computer network 160 via a router 126. The one or more physical servers 122 may host functionality that provides a network application (e.g, a news content site, etc.) to a user. As discussed in connection with FIG. 2, the functionality hosted by the one or more physical servers 122 may include web or HTTP servers, ad serving systems, geo-targeting systems, and the like. Still further, some or all of the functionality described herein may be accessible using an HTTP interface or presented as a web service using SOAP or other suitable protocols.

Content data store 124 may store content as digital content data objects. A content data object or content object, in particular implementations, is an individual item of digital information typically stored or embodied in a data file or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Structurally, content data store 124 may connote a large class of data storage and management systems. In particular implementations, content data store 24 may be implemented by any suitable physical system including components, such as database servers, mass storage media, media library systems, and the like.

Network application hosting site 120, in one implementation, provides web pages, such as front pages, that include an information package or module describing one or more attributes of a network addressable resource, such as a web page containing an article or product description, a downloadable or streaming media file, and the like. The web page may also include one or more ads, such as banner ads, text-based ads, sponsored videos, games, and the like. Generally, web pages and other resources include hypertext links or other controls that a user can activate to retrieve additional web pages or resources. A user "clicks" on the hyperlink with a computer input device to initiate a retrieval request to retrieve the information associated with the hyperlink or control.

Figure 2:
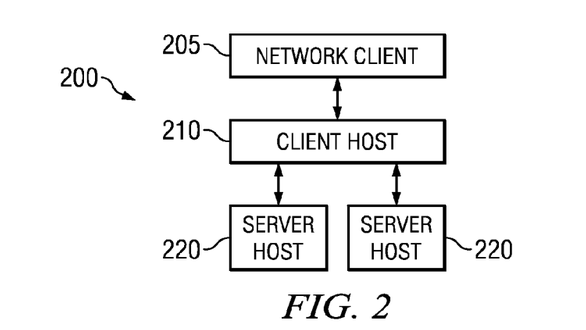
FIG. 2 illustrates a client host server environment, in accordance with embodiments of the present disclosure.

FIG. 2 illustrates a client host server environment 200, in accordance with embodiments of the present disclosure. As FIG. 2 illustrates, network application hosting site 120 may include one or more network clients 205 and one or more client hosts 210 operating in conjunction with one or more server hosts 220. The foregoing functional modules may be realized by hardware, executable modules stored on a computer readable medium, or a combination of both. The functional modules, for example, may be hosted on one or more physical servers 122 and/or one or more client computers 182, 184.

Network client 205 may include a web client hosted on client computers 182, 184, a client host 210 located on physical server 122, or a server host located on physical server 122. Client host 210 may be an executable web or HTTP server module that accepts HyperText Transport Protocol (HTTP) requests from network clients 205 acting as a web clients, such web browser client applications hosted on client computers 182, 184, and serving HTTP responses including contents, such as HyperText Markup Language (HTML) documents and linked objects (images, advertisements, etc.). Client host 210 may also be an executable module that accepts Simple Object Access Protocol (SOAP) requests from one or more client hosts 210 or one or more server hosts 220. In some embodiments, client host 210 may have the capability of delegating all or part of single or multiple requests from network client 205 to one or more server hosts 220. Client host 210, as discussed above, may operate to deliver a network application, such as an informational web page or an Internet search service.

In a particular implementation, client host 210 may act as a server host 220 to another client host 210 and may function to further delegate requests to one or more server hosts 220 and/or one or more client hosts 210. Server hosts 220 host one or more server applications, such as an ad selection server, sponsored search server, content customization server, and the like.

In a social networking service, each user of the social network may create a network profile (e.g., username, password, and/or biographical information) via a client node 182, 184. For example, a user may access the social network via an application program available at the client node and/or via a website for the social network. Via client nodes 182, 184, each user may also specify other users in the social network to which the user has a social tie. In this disclosure, the terms "social tie" and "tie" may be used to indicate a social relationship between two users in a social network (e.g., a "friend," "buddy," "connection," "link," etc.), while the term "contact" may be used to indicate a user for which a user has a social tie. In addition to a social tie existing based on a declared relationship between users, a social tie may also be derived by the social networking service on the basis of shared interests and/or biographical information of the users. The social networking application, user biographical information, social ties, and contact information may be hosted at network application hosting site 120. Users using client nodes 182, 184 may access the social networking application via network cloud 160.

Once a user's contacts have been identified, a user may be able to access the social networking application website and/or application to view some or all of the profile information of his or her contacts, including, for example, actions performed by the contacts.

Figure 3A:
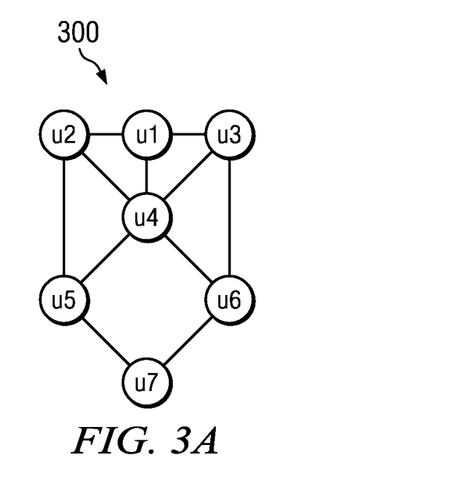
FIG. 3A illustrates an example graph for a social network, in accordance with embodiments of the present disclosure.

FIG. 3A illustrates an example graph 300 of users and social ties in a social network, in accordance with embodiments of the present disclosure. In FIG. 3, vertices of graph 300 indicate users in the social network, and the edges of graph 300 depict the existence of social ties between users in the social network. For example, an edge connecting two vertices may indicate that such users are contacts (e.g., "friends"). For example, as depicted in graph 300, user u1 is a contact of users u2, u3, and u4, but not a contact of users u5, u6, and u7.

Figure 3B:
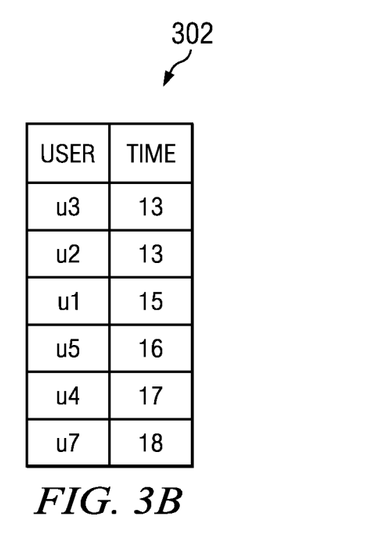
FIG. 3B illustrates an example action log for a social network, in accordance with embodiments of the present disclosure.

FIG. 3B illustrates an example action log 302 for a social network represented by graph 300, in accordance with embodiments of the present disclosure. As seen in FIG. 3B, action log 302 may be a relation Actions (User, Time), including one or more tuples (u, t) indicating that a user u performed a particular action at time t. Such an action log may include such a tuple for one or more actions performed by one of more users of the social network. By linking the actions of a social graph and an action log, the propagation of influence for various actions, and thus the social capital of a user with respect to such action, can be determined.

In operation, a network application may calculate a score for a particular action based on the social capital of one or more users of a social network, as explained in greater detail below. An influence score for an action for each user may be calculated based on occurrences of the action or a derivative action of the action by other users that occur after the user performs such action. For example, the influence score may be a function of the number of times the action or a derivative action is performed by contacts of the user after the performance of the action by the user and/or the frequency of performance of the action or a derivative action by contacts of the user. In addition or alternatively, the influence score for an action for a user may be a function of the influence scores for the action of contacts of the user, such that the influence score for a user may account for the propagation of the user's influence through the social network. In addition or alternatively, the influence score including portions thereof (e.g., the number of times the action or a derivative action is performed by contacts of the user after the performance of the action by the user, the frequency of performance of the action or a derivative action by contacts of the user, influence scores of a user's contacts) may be a function of the time that subsequent actions or derivative actions by a user's contacts are performed after the initial performance of the action by the user, such that later-occurring instances of the action or a derivative action have lesser weight in calculating the influence score than those occurring earlier. In some embodiments, an initial influence score may be assumed for each user, and a final influence score for each user may be iteratively and/or recursively calculated based on the influence scores of contacts of each user.

After influence scores for an event have been calculated for users in a social network, the network application may calculate an action score associated with the action. Such action score may be the sum of the individual influence scores of the users of a social network respective to the action. By analyzing action scores for numerous actions, the actions may be ranked according to action score. Accordingly, the network application may recommend actions to users of a social network based on social capital of its users (e.g., recommendation of song based on influence as determined by the action of downloading of the song by users of the social network, recommendation of a restaurant based on influence as determined by the action of "checking in" to the restaurant, etc.).

As used herein, a "derivative action" of a particular action may be an action that is related to, based on, and/or similar to, but not necessarily identical to the particular action. For example, a first user may perform the action of reviewing a restaurant, and a second user may perform the derivative action of checking in to the restaurant.

Figure 4:
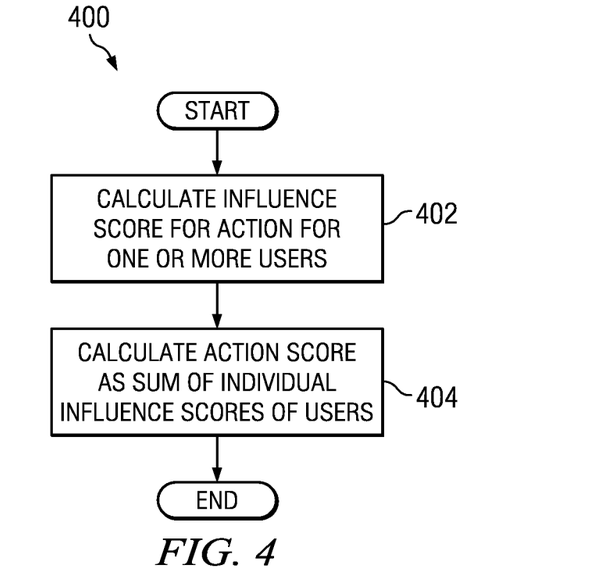
FIG. 4 illustrates a flow chart of an example method of calculating an action score, in accordance with embodiments of the present disclosure.

FIG. 4 illustrates a flow chart of an example method 400 of calculating an action score, in accordance with embodiments of the present disclosure. As noted above, teachings of the present disclosure may be implemented in a variety of configurations of systems 100 and 200. As such, the preferred initialization point for method 400 and the order of the operations 402 and 404 comprising method 400 may depend on the implementation chosen.

In operation 402, a network application may calculate an influence score for an action for each of one or more users of a social network. As described above, such influence score may be based on one or more of the number of times the action or a derivative action is performed by contacts of the user after the performance of the action by the user, the frequency of performance of the action or a derivative by contacts of the user, the influence scores for the action of contacts of the user, and/or the time that subsequent actions or derivative actions by a user's contacts are performed after the initial performance of the action by the user.

In operation 404, the network application may calculate an action score. The action score may be equal to the sum of individual influence scores of the individual users performing the action.

Although FIG. 4 discloses a particular number of operations to be taken with respect to method 400, method 400 may be executed with greater or lesser operations than those depicted in FIG. 4. In addition, although FIG. 4 discloses a certain order of operations to be taken with respect to method 400, the operations comprising method 400 may be completed in any suitable order.

The various operations of system 400 may be implemented in hardware, software, or a combination thereof. Operations implemented in software may be implemented as a program of instructions embodied in a computer-readable medium (e.g., memory 504 depicted in FIG. 5 described below) and executable by a processor (e.g., processor 502 depicted in FIG. 5 described below).

Figure 5:
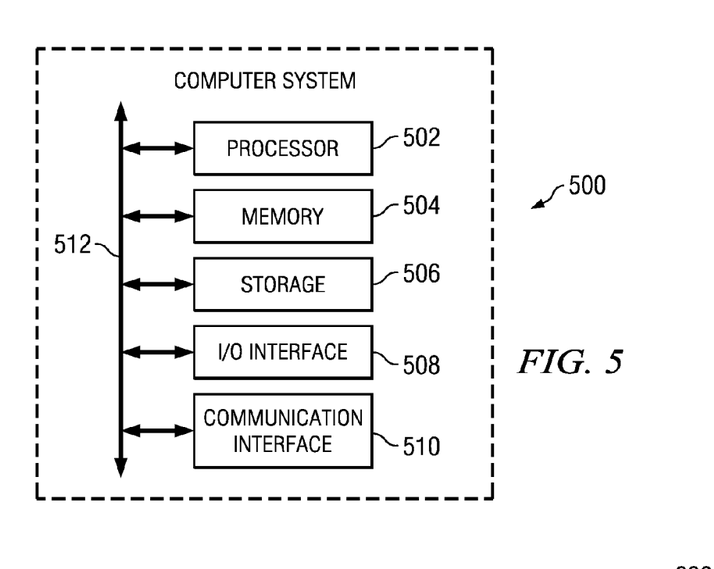
FIG. 5 illustrates an example computer system, in accordance with embodiments of the present disclosure.

Particular embodiments of the present disclosure may be implemented on one or more computer systems. FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include an HDD, a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form.

Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 502 (such as, for example, one or more internal registers or caches), one or more portions of memory 504, one or more portions of storage 506, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Figure 6:
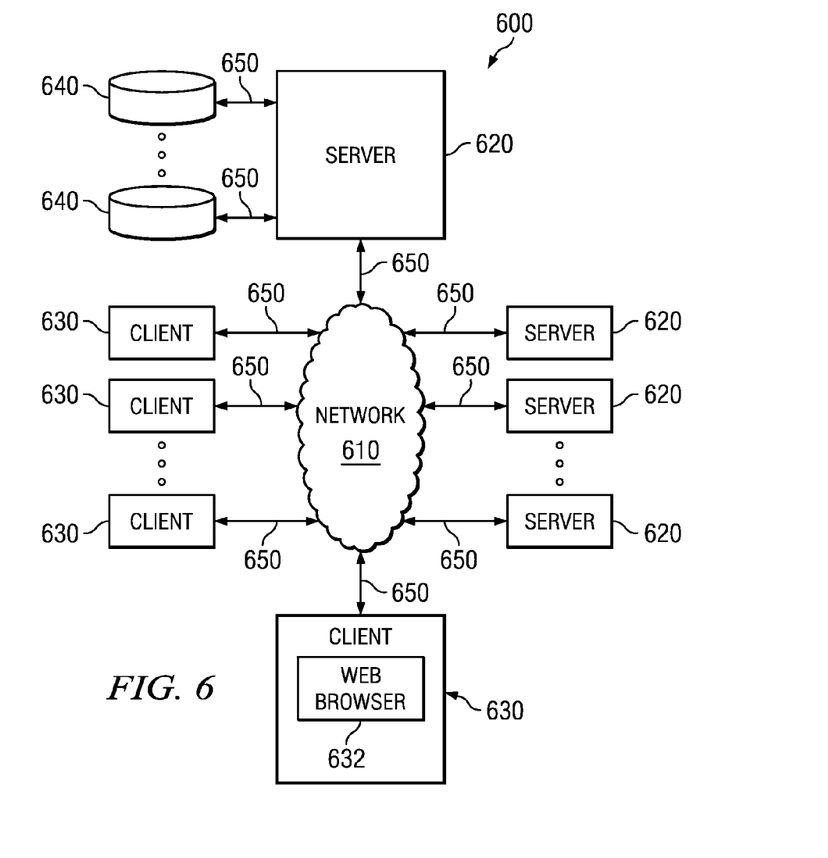
FIG. 6 illustrates an example network environment, in accordance with embodiments of the present disclosure.

Particular embodiments may be implemented in a network environment. FIG. 6 illustrates an example network environment 600. Network environment 600 includes a network 610 coupling one or more servers 620 and one or more clients 630 to each other. In particular embodiments, network 610 is an intranet, an extranet, a virtual private network (VPN), a local area network (LAN), a wireless LAN (WLAN), a wide area network (WAN), a metropolitan area network (MAN), a portion of the Internet, or another network 610 or a combination of two or more such networks 610. This disclosure contemplates any suitable network 610.

One or more links 650 couple a server 620 or a client 630 to network 610. In particular embodiments, one or more links 650 each includes one or more wireline, wireless, or optical links 650. In particular embodiments, one or more links 650 each includes an intranet, an extranet, a VPN, a LAN, a WLAN, a WAN, a MAN, a portion of the Internet, or another link 650 or a combination of two or more such links 650. This disclosure contemplates any suitable links 650 coupling servers 620 and clients 630 to network 610.

In particular embodiments, each server 620 may be a unitary server or may be a distributed server spanning multiple computers or multiple datacenters. Servers 620 may be of various types, such as, for example and without limitation, web server, news server, mail server, message server, advertising server, file server, application server, exchange server, database server, or proxy server. In particular embodiments, each server 620 may include hardware, software, or embedded logic components or a combination of two or more such components for carrying out the appropriate functionalities implemented or supported by server 620. For example, a web server is generally capable of hosting websites containing web pages or particular elements of web pages. More specifically, a web server may host HTML files or other file types, or may dynamically create or constitute files upon a request, and communicate them to clients 630 in response to HTTP or other requests from clients 630. A mail server is generally capable of providing electronic mail services to various clients 630. A database server is generally capable of providing an interface for managing data stored in one or more data stores.

In particular embodiments, one or more data storages 640 may be communicatively linked to one or more severs 620 via one or more links 650. In particular embodiments, data storages 640 may be used to store various types of information. In particular embodiments, the information stored in data storages 640 may be organized according to specific data structures. In particular embodiments, each data storage 640 may be a relational database. Particular embodiments may provide interfaces that enable servers 620 or clients 630 to manage, e.g., retrieve, modify, add, or delete, the information stored in data storage 640.

In particular embodiments, each client 630 may be an electronic device including hardware, software, or embedded logic components or a combination of two or more such components and capable of carrying out the appropriate functionalities implemented or supported by client 630. For example and without limitation, a client 630 may be a desktop computer system, a notebook computer system, a netbook computer system, a handheld electronic device, or a mobile telephone. This disclosure contemplates any suitable clients 630. A client 630 may enable a network user at client 630 to access network 630. A client 630 may enable its user to communicate with other users at other clients 630.

A client 630 may have a web browser 632, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 630 may enter a Uniform Resource Locator (URL) or other address directing the web browser 632 to a server 620, and the web browser 632 may generate a Hyper Text Transfer Protocol (HTTP) request and communicate the HTTP request to server 620. Server 620 may accept the HTTP request and communicate to client 630 one or more Hyper Text Markup Language (HTML) files responsive to the HTTP request. Client 630 may render a web page based on the HTML files from server 620 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could me made hereto without departing from the spirit and scope of the invention.

What is claimed is:

1. A method comprising:
   determining that a user of a social network has performed a first action, the user having one or more contacts in the social network;
   determining that one or more contacts of the user performed a second action after the first action by the user, the second action comprising either the first action or a derivative action based on the first action;
   calculating an influence score for the user relating to the first action, the influence score for the user being calculated based on the second action by the one or more contacts, the influence score of the user further being calculated based on influence scores of the one or more contacts of the user, the influence scores of the one or more contacts of the user being calculated based on the performance of a third action by one or more additional contacts of each of the one or more contacts of the user after the second action, the third action comprising either the second action or a derivative action based on the second action; and calculating an action score based on the influence score for the user.

2. The method of claim 1, wherein the influence score is based on a number of times the action is performed by the contact.

3. The method of claim 1, wherein the influence score is based on a frequency of performance of the action by the contact.

4. The method of claim 1, wherein the influence score is based on a time that the action is performed by the contact.

5. The method of claim 1, wherein the action score equals a sum of influence scores of the user.

6. An apparatus, comprising:
one or more processors;
one or more network interfaces;
a memory; and
computer-executable instructions stored on a computer readable medium, the instructions readable by the one or more processors, the instructions when read and executed, causing the One or more processors to:
determine that a user of a social network has performed a first action, the user having one or more contacts in the social network;
determine that one or more contacts of the user performed a second action after the first action by the user, the second action comprising either the first action or a derivative action based on the first action
calculating an influence score for the user relating to the first action, the influence score for the user being calculated based on the second action by the one or more contacts, the influence score of the user further being calculated based on influence scores of the one or more contacts of the user, the influence scores of the one or more contacts of the user being calculated based on the performance of a third action by one or more additional contacts of each of the one or more contacts of the user after the second action, the third action comprising either the second action or a derivative action based on the second action; and
calculate an action score based on the influence score for the user.

7. The apparatus of claim 6, wherein the influence score is based on a number of times the action is performed by the contact.

8. The apparatus of claim 6, wherein the influence score is based on a frequency of performance of the action by the contact.

9. The apparatus of claim 6, wherein the influence score is based on a time that the action is performed by the contact.

10. The apparatus of claim 6, wherein the action score equals a sum of influence scores of the user.

11. An article of manufacture comprising:
a non-transitory computer readable medium; and
computer-executable instructions stored on the non-transitory computer readable medium, the instructions readable by a processor, the instructions, when read and executed, causing the processor to:
determine that a user of a social network has performed a first action, the user having one or more contacts in the social network;
determine that one or more contacts of the user performed a second action after the first action by the user, the second action comprising either the first action or a derivative action based on the first action
calculating an influence score for the user relating to the first action, the influence score for the user being calculated based on the second action by the one or more contacts, the influence score of the user further being calculated based on influence scores of the one or more contacts of the user, the influence scores of the one or more contacts of the user being calculated based on the performance of a third action by one or more additional contacts of each of the one or more contacts of the user after the second action, the third action comprising either the second action or a derivative action based on the second action; and
calculate an action score based on the influence score for the user.

12. The article of claim 11, wherein the influence score is based on a number of times the action is performed by the contact.

13. The article of claim 11, wherein the influence score is based on a frequency of performance of the action by the contact.

14. The article of claim 11, wherein the influence score is based on a time that the action is performed by the contact.

15. The article of claim 11, wherein the action score equals a sum of influence scores of the user.

* * * * *